US009774183B2

(12) United States Patent
Sihler et al.

(10) Patent No.: US 9,774,183 B2
(45) Date of Patent: Sep. 26, 2017

(54) METHODS AND SYSTEMS FOR SUBSEA DIRECT CURRENT POWER DISTRIBUTION

(71) Applicant: General Electric Company, Schenectady, NY (US)

(72) Inventors: Christof Martin Sihler, Bavaria (DE); Manoj Ramprasad Shah, Latham, NY (US); Simon Herbert Schramm, Bavaria (DE); Svend Erik Rocke, Lier (NO); Piniwan Thiwanka Bandara Wijekoon, Bavaria (DE)

(73) Assignee: General Electric Company, Niskayuna, NY (US)

( * ) Notice: Subject to any disclaimer, the term of this patent is extended or adjusted under 35 U.S.C. 154(b) by 836 days.

(21) Appl. No.: 14/142,101

(22) Filed: Dec. 27, 2013

(65) Prior Publication Data
US 2015/0188314 A1    Jul. 2, 2015

(51) Int. Cl.
| | |
|---|---|
| H02J 1/00 | (2006.01) |
| E21B 36/00 | (2006.01) |
| H02J 3/00 | (2006.01) |
| E21B 41/00 | (2006.01) |
| H02J 3/36 | (2006.01) |

(52) U.S. Cl.
CPC ............. *H02J 1/00* (2013.01); *E21B 36/001* (2013.01); *E21B 41/0007* (2013.01); *H02J 3/00* (2013.01); *H02J 3/36* (2013.01); *Y02E 60/60* (2013.01); *Y10T 307/352* (2015.04); *Y10T 307/707* (2015.04)

(58) Field of Classification Search
CPC ..................................... H02J 1/00; H02J 1/10
See application file for complete search history.

(56) References Cited

U.S. PATENT DOCUMENTS

| | | | |
|---|---|---|---|
| 7,817,422 B2 | 10/2010 | Gunturi et al. | |
| 7,851,943 B2 | 12/2010 | Datta et al. | |
| 7,880,419 B2 | 2/2011 | Sihler et al. | |
| 8,373,307 B2 | 2/2013 | Sihler et al. | |
| 2008/0037190 A1 | 2/2008 | Datta et al. | |
| 2008/0304300 A1 | 12/2008 | Raju et al. | |

(Continued)

FOREIGN PATENT DOCUMENTS

EP    2666956 A1    11/2013

OTHER PUBLICATIONS

European Search Report and Opinion issued in connection with corresponding EP Application No. 14199503.5 on May 11, 2015.

(Continued)

*Primary Examiner* — Jared Fureman
*Assistant Examiner* — Rafael Pacheco
(74) *Attorney, Agent, or Firm* — Pabitra K. Chakrabarti

(57) ABSTRACT

A subsea power distribution module includes an outer vessel defining an interior chamber and a plurality of power modules disposed within the interior chamber. The outer vessel is configured to maintain a pressure within the interior chamber substantially the same as an ambient pressure outside the outer vessel. Each power module includes a pressure vessel defining an interior chamber and a power converter disposed within the interior chamber of the pressure vessel. Each pressure vessel is configured to maintain a substantially constant pressure within the interior chamber of the pressure vessel.

19 Claims, 3 Drawing Sheets

(56) References Cited

U.S. PATENT DOCUMENTS

| | | | |
|---|---|---|---|
| 2009/0226262 A1* | 9/2009 | Karstad | B63G 8/08 405/191 |
| 2009/0296433 A1 | 12/2009 | Sihler et al. | |
| 2010/0038774 A1 | 2/2010 | Zhang et al. | |
| 2010/0133901 A1 | 6/2010 | Zhang et al. | |
| 2010/0139544 A1* | 6/2010 | B | B63G 8/08 114/337 |
| 2011/0241433 A1 | 10/2011 | Sihler et al. | |
| 2012/0217802 A1 | 8/2012 | Kanakasabai et al. | |
| 2012/0268099 A1 | 10/2012 | Sihler et al. | |
| 2013/0026831 A1* | 1/2013 | Sihler | H02J 3/32 307/19 |
| 2013/0258733 A1 | 10/2013 | Zhang et al. | |
| 2015/0188315 A1* | 7/2015 | Hytten | H02J 1/08 307/18 |

OTHER PUBLICATIONS

U.S. Appl. No. 13/600,556, filed Aug. 31, 2012.
U.S. Appl. No. 13/478,310, filed May 23, 2012.
U.S. Appl. No. 13/946,408, filed Jul. 19, 2013.
U.S. Appl. No. 13/769,919, filed Feb. 19, 2013.

* cited by examiner

METHODS AND SYSTEMS FOR SUBSEA DIRECT CURRENT POWER DISTRIBUTION

BACKGROUND

This description relates to power transmission and distribution, and, more particularly, to systems and methods for subsea high-voltage direct current (HVDC) transmission and distribution system.

As oil and gas fields in shallow waters diminish, producers are tapping offshore fields in deeper waters with oil installations that operate far below the surface of the sea. The typical equipment for such subsea oil recovery and production include gas compressors and various pumps for multiple functions. Electric variable speed drive (VSD) and motor systems are one way to power such equipment directly under the deep water. Therefore, the delivery of electric power from a remote onshore utility grid or power generation is important to secure a reliable production and processing of oil and gas in subsea locations. Typically, the transmission power requirement is approximately one hundred megawatts for medium to large oil/gas fields.

Alternating current (AC) transmission and distribution systems are sometimes used for delivery of power to subsea locations. Such systems typically deliver AC power from a platform or terrestrial location to a large subsea transformer through a large power cable. Power is transferred from the subsea transformer to subsea AC switchgear through another power cable. The subsea AC switchgear feeds AC power to one or more subsea VSDs through yet another cable. The VSDs each provide variable AC power to electric motors through a power cable. The connections between components in subsea AC distribution systems typically require wet mateable connectors, which are significantly more expensive than dry mateable connectors. Moreover, the electronic components in subsea VSDs generally cannot tolerate high pressures and must be placed in large, thick walled pressure vessels capable of withstanding the high pressures present at various depths of water while maintaining a substantially constant pressure within the pressure vessel. Further, as pump, motor, and distribution components increase in power, size and weight increases. AC transmission and distribution systems also face technical challenges, which become more significant when transmission distance is in excess of one-hundred kilometers. For example, the significant reactive power drawn from the distributed subsea cable capacitors restrains the power delivery capability as well as increases the system cost.

BRIEF DESCRIPTION

In one embodiment, a subsea power distribution module includes an outer vessel defining an interior chamber and a plurality of power modules disposed within the interior chamber. The outer vessel is configured to maintain a pressure within the interior chamber substantially the same as an ambient pressure outside the outer vessel. Each power module includes a pressure vessel defining an interior chamber and a power converter disposed within the interior chamber of the pressure vessel. Each pressure vessel is configured to maintain a substantially constant pressure within the interior chamber of the pressure vessel.

Another embodiment is a subsea power distribution system for providing alternating current (AC) power to at least one load located underwater. The system includes a subsea power distribution module configured to receive a direct current (DC) power input and provide AC power to a load. The subsea power distribution module includes an outer vessel defining an interior chamber, and a plurality of power modules disposed within the interior chamber of the outer vessel. The outer vessel is configured to maintain a pressure within the interior chamber substantially the same as an ambient pressure outside the outer vessel. Each power module includes a pressure vessel defining an interior chamber and configured to maintain a substantially constant pressure within the interior chamber of the pressure vessel, and a power converter disposed within the interior of the pressure vessel.

In another embodiment, a subsea power distribution system is described for providing alternating current (AC) power to a plurality of loads located underwater. The system includes a plurality of subsea power distribution modules configured to receive a direct current (DC) power input from a DC source. Each subsea power distribution module is configured to receive the DC power input and provide AC power to a different load of the plurality of loads. Each subsea power distribution module includes an outer vessel defining an interior chamber, and a plurality of power components disposed within the interior chamber of the outer vessel. The outer vessel is configured to maintain a pressure within the interior chamber substantially the same as an ambient pressure outside the outer vessel. The plurality of power components in each module is configured to receive the DC power input and output AC power to the module's load.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to systems and methods for subsea high-voltage direct current (HVDC) transmission and distribution systems. More particularly, embodiments of this disclosure relate to a modular, subsea, DC power distribution and transmission system in which a plurality of smaller power converters are integrated into a single subsea power distribution module for providing alternating current (AC) power to one or more loads. Thus, the exemplary embodiments may reduce system complexity, facilitate cooling, reduce total system weight, reduce the number of wet mateable connections used in a system, and reduce the number of components exposed to seawater.

The following description refers to the accompanying drawings, in which, in the absence of a contrary representation, the same numbers in different drawings represent similar elements.

Figure 1:
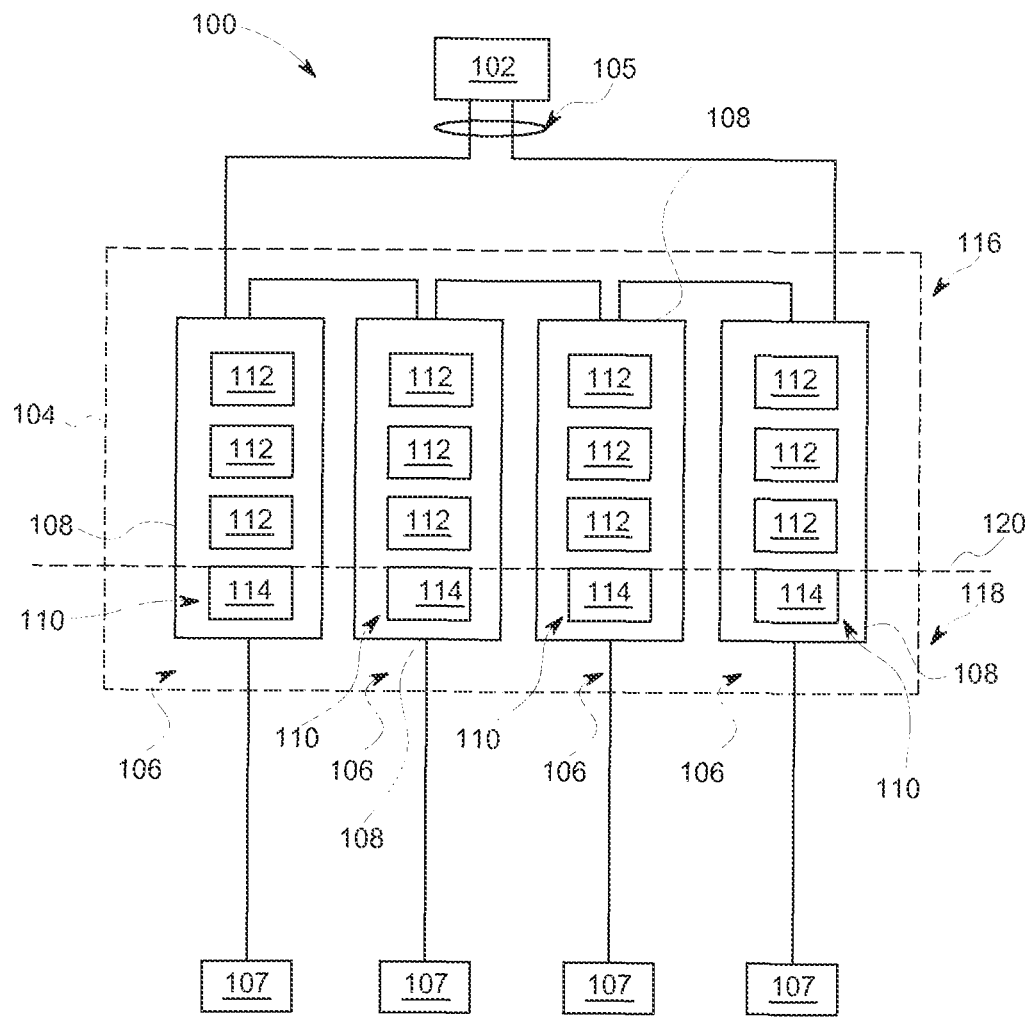
FIG. 1 is a schematic block diagram of an exemplary direct current (DC) subsea power distribution system.

FIG. 1 is a schematic block diagram of an exemplary direct current (DC) subsea power distribution system 100 powered by a direct current (DC) power source 102. In the exemplary embodiment, DC power source 102 is a platform based alternating current (AC) to DC power converter that converts AC power from an AC power source, e.g., without limitation, an AC power grid, to DC power. In other embodiments, DC power source 102 may be a land based DC power source, a DC power generator (whether land or platform based), or any other suitable DC power source. DC power source 102 is a high voltage DC power source. In the example embodiment, DC power source 102 provides a thirty kilovolt (kV) DC output. In other embodiments, DC power source provides any other suitable high voltage DC output that enables operation as described herein.

A subsea power distribution assembly 104 is electrically coupled to and receives DC power from DC power source 102 through a two wire umbilical cable 105. Subsea power distribution assembly 104 includes multiple subsea power distribution modules 106 electrically coupled together. Each subsea power distribution module 106 provides AC power to a separate load 107. In an exemplary embodiment, loads 107 are electric motors for powering fluid pumps used in subsea boosting. Alternatively, loads may be any other electrical load that may be powered by subsea power distribution modules 106. In the illustrated embodiment, assembly 104 includes four subsea power distribution modules 106. In other embodiments, assembly 104 may include more or fewer (including one) subsea power distribution modules 106. The number of subsea power distribution modules 106 is generally selected based on the number and size of loads.

Each subsea power distribution module 106 includes an outer vessel 108 defining an interior chamber 110. Outer vessel 108 is configured to maintain substantially the same pressure within interior chamber 110 as the ambient pressure outside outer vessel 108. In an exemplary embodiment, free space (i.e., space not occupied by components) within interior chamber 110 is filled with oil. Power modules 112 are disposed within interior chamber 110. In the exemplary embodiment, power modules 112 receive DC power from source 102 and output AC power for delivery to loads 107.

In other embodiments, power modules 112 receive DC power from source 102 and output DC power for delivery to loads 107 or for further conversion to AC power. Although three power modules 112 are shown in each subsea power distribution module 106 in FIG. 1, subsea power distribution modules 106 may include any suitable number of power distribution modules.

Each power module 112 includes a pressure vessel (not shown in FIG. 1) defining an interior chamber and configured to maintain a substantially constant pressure within the interior chamber of the pressure vessel without regard to the ambient pressure outside of outer vessel 108. In a particular embodiment, the pressure vessels are configured to maintain a substantially constant pressure of 100 kilopascals within the chamber. Each power module 112 includes a power converter (not shown in FIG. 1) disposed within the interior of its pressure vessel. In the exemplary embodiment, the power converters each include one or more DC to AC (DC/AC) power converters. The DC/AC power converters may be any suitable isolated or non-isolated DC/AC power converters. Moreover, the DC/AC power converters may each include any suitable number of converter stages. For example, a DC/AC power converter may be a single stage DC/AC converter. Alternatively, a DC/AC power converter may include one or more DC to DC power converter stages, followed by a DC/AC converter stage. In other embodiments, the power converters each include one or more DC to DC (DC/DC) power converters.

In the exemplary embodiment, subsea power distribution modules 106 each include one or more transformers 114 for isolating a DC side 116 of system 100 from an AC side 118 of system 100 (separated in FIG. 1 by an isolation line 122). AC power is delivered from power modules 112 to loads 107 through transformers 114. Other embodiments do not include transformers 114.

Subsea power distribution modules 106 are electrically coupled together in series. One wire of umbilical cable 105 is connected to the first subsea power distribution module 106 in the series, while the second wire of umbilical cable 105 is connected to the last subsea power distribution module 106 in the series. In some embodiments, switchyard modules (not shown in FIG. 1), also sometimes referred to as bypass modules, allow for selective removal of a subsea power distribution module 106 from the series connection. The switchyard modules are coupled between the DC power input of each power distribution module 106 and its associated power modules 112. The switchyard module permits selective bypassing of the subsea power distribution module 106 by electrically disconnecting it from DC power source 102 and the other subsea power distribution modules 106, e.g., in response to a received instruction, in response to a detected condition etc. Moreover, in some embodiments, the bypass module permits selective coupling of one or more power modules 112 to DC power source 102 and/or other subsea power distribution modules 106.

In some embodiments, subsea boosting module 106 includes one or more cooling systems within interior chamber 110. Cooling systems may include active and/or passive cooling systems used to cool fluid power modules 112.

Figure 2:
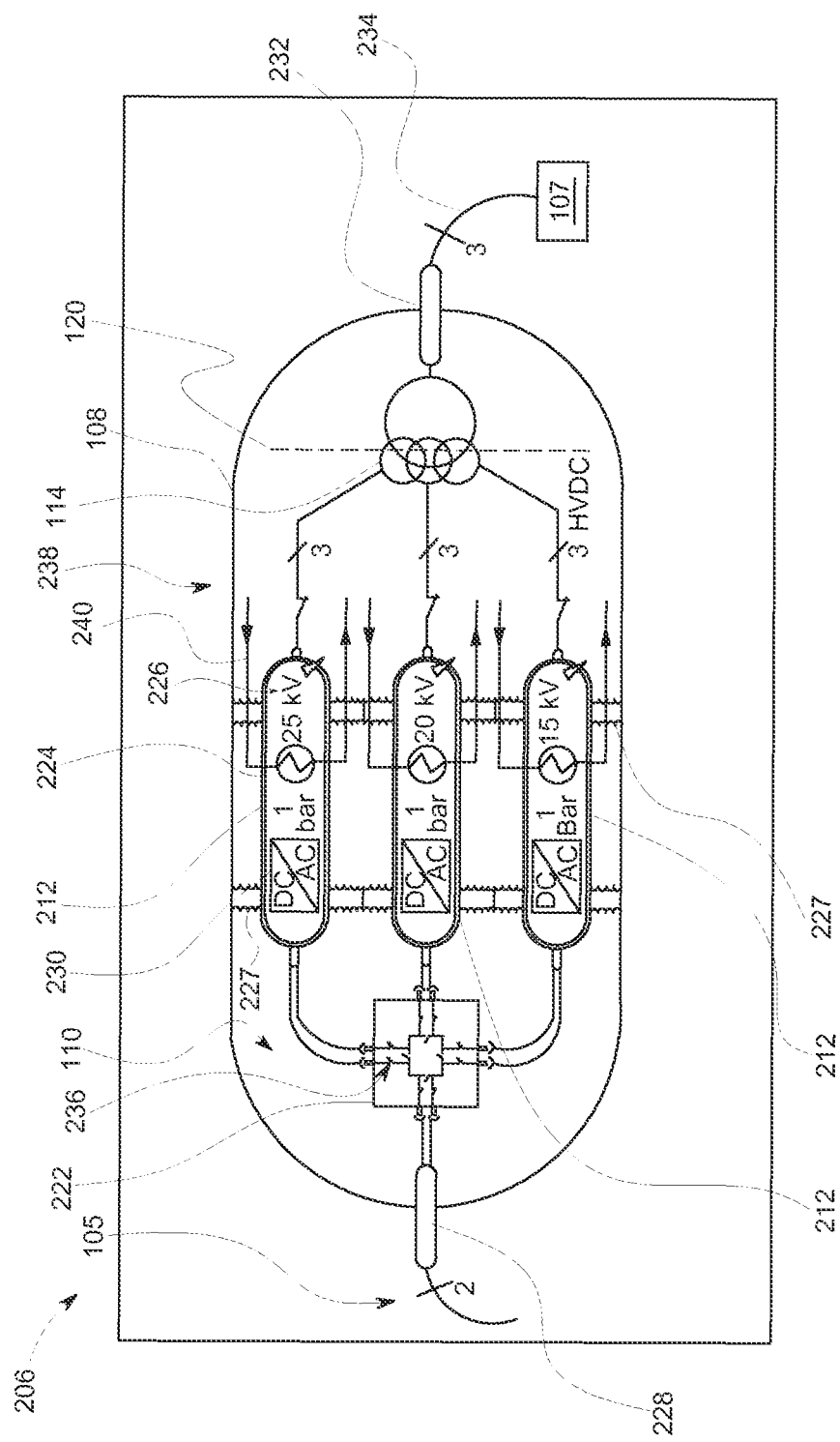
FIG. 2 is a cross-sectional view of an exemplary subsea power distribution module for use in the system shown in FIG. 1.
Figure 3:
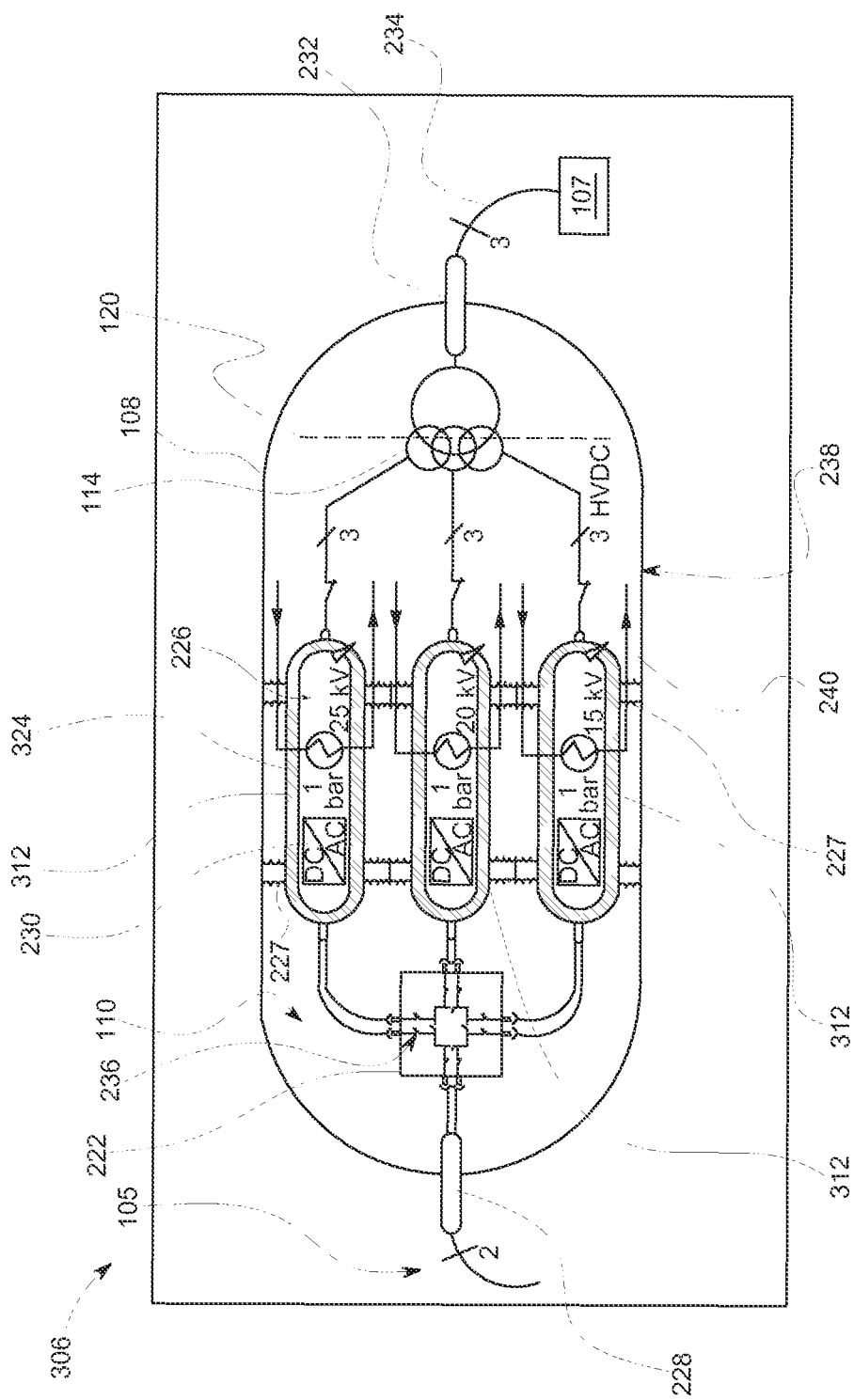
FIG. 3 is a cross-sectional view of an alternative subsea power distribution module for use in the system shown in FIG. 1.

FIGS. 2 and 3 are cross sectional views of example embodiments of subsea power distribution modules for use as subsea power distribution modules 106 in system 100 (shown in FIG. 1). Similar components in FIGS. 2 and 3 are identified with the same reference numbers.

FIG. 2 is a cross-sectional view of an exemplary subsea power distribution module 206 for use in system 100 (shown in FIG. 1). Subsea power distribution module 206 is configured for use at a depth of no more than about 1000 meters, at which depth the ambient pressure around power distribution module 206 is about 10,000 kilopascals. Subsea power distribution module 206 includes a switchyard module 222, power modules 212, and transformer 114.

Outer vessel 108 is configured to maintain substantially the same pressure in interior chamber 110 as the ambient pressure outside of outer vessel 108. Interior chamber 110 is filled with an oil. Alternatively, interior chamber may be filled with any suitable material that permits outer vessel to function substantially as described herein. Power modules 212 include a pressure vessel 224 defining an interior chamber 226. Power modules 212 are configured to maintain a substantially constant pressure (e.g., about 101.325 kilopascals) in interior chamber 226 regardless of the ambient pressure outside outer vessel 108. Power modules 212 are mounted on insulators 227. In an example embodiment, pressure vessel 224 includes thermally conductive walls such that heat generated within power modules 212 may be conducted through the walls of pressure vessel 224 to the oil in interior chamber 110. The oil in interior chamber 110 may be actively cooled or passively cooled by lower temperature ambient external fluid (e.g., water) through the walls of outer vessel 108. Thus, the power module's components within pressure vessel 224 may be passively cooled without heat exchanger pipes passing through pressure vessel 224.

Interface 228 (which may also be referred to as an input) couples DC power from DC power source 102 (shown in FIG. 1) to subsea power distribution module 206 (and more specifically to switchyard module 222 within outer vessel 108). In the exemplary embodiment, subsea power distribution module 206 is also coupled in series with other subsea power distribution module 206 through interface 228. Interface 228 is configured for a wet mateable connection, i.e. it includes a wet mateable connector, with one or more power cables, including umbilical cable 105. The exemplary interface 228 is a wet mateable connector without a differential pressure barrier. Alternatively, interface 228 may be any other suitable connector.

Output 232 couples power from subsea power distribution module 206 to load 107. In the exemplary embodiment, output 232 couples AC power from transformer 114 out of pressure vessel 224 through a cable 234 to load 107. Output 232 is configured for a wet mateable connection, i.e. it includes a wet mateable connector (not shown). In some embodiments, output 232 is a wet mateable connector without a differential pressure barrier.

Each power module 212 includes a power converter 230. The exemplary power converters 230 are non-isolated DC/AC converters. Power converters 244 are configured to receive DC power from source 102 through interface 228 and switchyard module 222, and to output AC power to load 107 through transformer 114.

Switchyard module 222 interconnects all of power modules 212 and interface 228. Switchyard module 222 includes switches 236 that may be controlled to selectively electrically couple/decouple individual power modules 212 or groups of power modules 212 to/from the other power modules 212. Moreover, switches 236 may be controlled to electrically couple/decouple all power modules 212 to/from interface 228.

In the exemplary embodiment, subsea power distribution module 206 includes cooling system 238 within vessel 108. Cooling system 238 pumps coolant through pipes 240 into power modules 212 to cool heat producing components (not shown) of power converters 230. Cooling system 238 may include active and/or passive cooling systems. In some embodiments, active cooling systems 238 include one or more cooling pumps powered by an electric motor (not shown).

FIG. 3 is a cross-sectional view of an exemplary subsea power distribution module 306 for use in system 100 (shown in FIG. 1). Subsea power distribution module 306 is configured for use at a depth of about 3000 meters, at which depth the ambient pressure around power distribution module 306 is about 30,000 kilopascals. Subsea power distribution module 306 includes switchyard module 222, power modules 312, and transformer 114.

Outer vessel 108 is configured to maintain substantially the same pressure in interior chamber 110 as the ambient pressure outside of outer vessel 108. Power modules 312 include a pressure vessel 324 defining an interior chamber 226. Power modules 312 are configured to maintain a substantially constant pressure (e.g., about 101 kilopascals, about 400 kilopascals, etc.) in interior chamber 226 regardless of the ambient pressure outside outer vessel 108. Because power modules 312 need to be able to withstand higher pressures than power modules 212, power modules 312 generally have thicker walls, more reinforcement, and/or are made of stranger materials than power modules 212.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the system may also be used in combination with other apparatus, systems, and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A subsea power distribution module for use in a direct current (DC) power system, said subsea power distribution module comprising:
    an outer vessel defining an interior chamber, said outer vessel configured to maintain a pressure within the interior chamber substantially the same as an ambient pressure outside said outer vessel; and
    a plurality of power modules disposed within the interior chamber of said outer vessel, each power module comprising:
        a pressure vessel defining an interior chamber and configured to maintain a substantially constant pressure within the interior chamber of said pressure vessel independent of the pressure within the interior chamber of said outer vessel; and a power converter disposed within the interior chamber of said pressure vessel.

2. The subsea power distribution module in accordance with claim 1 further comprising:
an interface for receiving an input DC power; and
a switchyard module disposed within the interior chamber of said outer vessel and coupled to said plurality of power modules, said switchyard module configured for selective coupling of said plurality of power modules to each other and to the interface.

3. The subsea power distribution module in accordance with claim 1, wherein said power converter comprises one of a DC to alternating current power converter and a DC to DC power converter.

4. The subsea power distribution module in accordance with claim 1 further comprising an oil that substantially fills the interior chamber of said outer vessel.

5. The subsea power distribution module in accordance with claim 4, wherein each said power module is configured to transfer heat generated within the interior chamber of said pressure vessel to said oil in the interior chamber of said outer vessel.

6. The subsea power distribution module in accordance with claim 1, wherein said pressure vessel is configured to maintain a substantially constant pressure of about 100 kilopascals within the interior chamber of said pressure vessel.

7. The subsea power distribution module in accordance with claim 1, wherein said outer vessel further comprises:
an interface configured for wet mateable connection to a DC power source without a differential pressure barrier; and
an output configured for wet mateable connection to a load.

8. A subsea power distribution system for providing alternating current (AC) power to at least one load located underwater, said system comprising:
a subsea power distribution module configured to receive a direct current (DC) power input and provide AC power to a load, said subsea power distribution module comprising:
an outer vessel defining an interior chamber, said outer vessel configured to maintain a pressure within the interior chamber substantially the same as an ambient pressure outside said outer vessel; and
a plurality of power modules disposed within the interior chamber of said outer vessel, each power module comprising:
a pressure vessel defining an interior chamber and configured to maintain a substantially constant pressure within the interior chamber of said pressure vessel independent of the pressure within the interior chamber of said outer vessel; and
a power converter disposed within the interior chamber of said pressure vessel.

9. The subsea power distribution system in accordance with claim 8, wherein said outer vessel further comprises:
an interface configured for wet mateable connection to a DC power source; and
an output configured for wet mateable connection to the load.

10. The subsea power distribution system in accordance with claim 8, wherein the load comprises an electric motor for driving a fluid pump.

11. The subsea power distribution system in accordance with claim 8, wherein each subsea distribution module further comprises:
an interface for receiving an input DC power; and
a switchyard module disposed within the interior chamber of said outer vessel and coupled to said plurality of power modules, said switchyard module configured for selective coupling of said plurality of power modules to each other and to the interface.

12. The subsea power distribution system in accordance with claim 8, wherein said power converter comprises at least one of a DC to AC power converter and a DC to DC power converter.

13. A subsea power distribution system for providing alternating current (AC) power to a plurality of loads located underwater, said system comprising:
a plurality of subsea power distribution modules configured to receive a direct current (DC) power input from a DC source, each subsea power distribution module configured to receive the DC power input and provide AC power to a different load of the plurality of loads, each subsea power distribution module comprises:
an outer vessel defining an interior chamber, said outer vessel configured to maintain a pressure within the interior chamber substantially the same as an ambient pressure outside said outer vessel;
a plurality of pressure vessels each defining an interior chamber and each disposed within the interior chamber of said outer vessel, wherein each said pressure vessel is configured to maintain a substantially constant pressure within the interior chamber of said pressure vessel independent of the pressure within the interior chamber of the outer vessel; and
a plurality of power components disposed within the respective interior chambers of said plurality of pressure vessels, said plurality of power components configured to receive the DC power input and output AC power to said module's load.

14. The subsea power distribution system in accordance with claim 13, wherein said plurality of subsea power distribution modules are electrically coupled together in series.

15. The subsea power distribution system in accordance with claim 13, wherein each subsea distribution module further comprises:
an interface for receiving the DC power input; and
a switchyard module disposed within the interior chamber of said outer vessel and configured for selective coupling of said plurality of power components to each other and to the interface.

16. The subsea power distribution system in accordance with claim 13, wherein said plurality of components comprises a plurality of DC to AC power converters.

17. The subsea power distribution system in accordance with claim 16, wherein each DC to AC power converter of said plurality DC to AC power converters is disposed within the interior chamber of a different one of said plurality of pressure vessels.

18. The subsea power distribution system in accordance with claim 17, wherein each said pressure vessel is configured to maintain a substantially constant pressure of about 100 kilopascals within the interior chamber of said pressure vessel.

19. The subsea power distribution system in accordance with claim 13, wherein each subsea distribution module is coupled to the DC source via a single wet mateable DC connector without a differential pressure barrier, and each subsea distribution module is coupled to its load via a single wet mateable AC connector.

* * * * *